(12) United States Patent
Odell (10) Patent No.: US 6,370,505 B1
(45) Date of Patent: Apr. 9, 2002

(54) SPEECH RECOGNITION SYSTEM AND METHOD

(76) Inventor: Julian Odell, 5 Fitzroy Lane, Cambridge, CB1 1HE (GB)

( * ) Notice: Subject to any disclaimer, the term of this patent is extended or adjusted under 35 U.S.C. 154(b) by 0 days.

(21) Appl. No.: 09/302,370

(22) Filed: Apr. 30, 1999

(30) Foreign Application Priority Data

May 1, 1998 (EP) .............................................. 98303440

(51) Int. Cl.⁷ .............................................. G10L 15/14
(52) U.S. Cl. ........................................ 704/256; 704/254
(58) Field of Search ................................ 704/240, 254, 704/256

(56) References Cited

U.S. PATENT DOCUMENTS

| 5,473,728 A | * | 12/1995 | Luginbuhl et al. | ........... 704/273 |
| 5,664,059 A | * | 9/1997 | Zhao | ........................ 704/254 |
| 5,794,192 A | * | 8/1998 | Zhao | ........................ 704/244 |
| 5,806,030 A | * | 9/1998 | Junqua | ....................... 704/245 |
| 5,825,978 A | * | 10/1998 | Digalakis et al. | ........... 704/256 |
| 5,864,810 A | * | 1/1999 | Digalakis et al. | ........... 704/255 |
| 5,913,188 A | * | 6/1999 | Digalakis et al. | ........... 704/223 |

FOREIGN PATENT DOCUMENTS

| EP | 0 559 349 A1 | 9/1993 | |
| EP | 0 704 171 A1 | 4/1996 | |
| EP | 0706171 A | * 4/1996 | ............. G10L/5/06 |
| EP | 0 953 971 A1 | 11/1999 | |

OTHER PUBLICATIONS

Watanabe, T. et al., "High Speed Speech Recognition," ICASSP, vol. 1, pp. 556–559 (1995).

* cited by examiner

Primary Examiner—Tālivaldis Ivars Šmits
(74) Attorney, Agent, or Firm—Theodore M. Magee; Westman, Champlin & Kelly, PA (57) ABSTRACT

The present invention relates to a method of processing speech, in which input speech is processed to determine an input speech vector ($o_r$) representing a sample of the speech. A number of possible output states are defined with each output state (j) being represented by a number of state mixture components (m). Each state mixture component is then approximated by a weighted sum of a number of predetermined generic components (x), allowing the likelihoods of each output states (j) corresponding to the input speech vector ($o_r$) to be determined.

19 Claims, 2 Drawing Sheets

SPEECH RECOGNITION SYSTEM AND METHOD

FIELD OF THE INVENTION

The present invention relates to a system and methods for employment in speech recognition.

BACKGROUND OF THE INVENTION

It has been a long desired goal to provide a machine which recognises human speech and can act upon it, either to perform particular control functions or to transform the speech into written text.

In recent years considerable progress has been made towards this goal, firstly by the provision of systems which recognise individual words, and secondly by the provision of systems which recognise strings of words. This second set of systems often operate by assessing the likelihood of a received word being adjacent to other detected words based upon both the likelihood of the word and the grammatical rules and vocabulary of the language being recognised. Whilst some systems are now available which do this to a considerable degree of accuracy, all such systems are computationally expensive, requiring a great deal of processing power and high speed processing circuitry to perform the recognition task at sufficient speed, particularly in relation to the assessment of the received speech's probability of correspondence to known stored alternatives.

One such known speech recognition system, as part of its statistical assessment of received speech, uses Hidden Markov Models (HMMs) and the evaluation of continuous probability distributions to calculate the likelihood of a particular frame of speech corresponding to a particular output state. Whilst such an evaluation system is effective, it can require up to 75% of the computational requirement of the whole recognition system.

An alternative system uses a discrete probability distribution (rather than the usual continuous one) for each possible output state. This is because with a discrete distribution a simple table look-up is all that is needed to determine the likelihood of each output state corresponding to the input speech. There is, however, a considerable reduction in accuracy, compared to the employment of continuous probability distributions.

This simplified system has itself been improved by the employment of a semi-continuous system or tied mixture system, in which each possible output state is given a probability based upon a weighted sum of a set of Gaussian components, rather than one of a small set of discrete values. This improves accuracy, but is still not on a par with continuous distribution systems.

In such systems of the prior art, evaluation of the likelihood of the various output states corresponding to the speech vector is achieved by evaluating the likelihood of each mixture component and then summing these likelihoods for the respective output state. Repeating this for all possible output states determines the likelihood of each output state, but is computationally very expensive.

SUMMARY OF THE INVENTION

The present invention is directed towards systems using continuous probability distributions and their methods and seeks to overcome some of the problems associated with them, such as their need for high processing speed and large amounts of processing capability.

According to a first aspect of the present invention there is provided a method of processing speech, the method comprising:

receiving the speech and determining therefrom an input speech vector ($o_r$) representing a sample of the speech to be processed; and, determining the likelihoods of a number of possible output states (j) corresponding to the input speech vector ($o_r$), wherein each output state (j) is represented by a number of state mixture components (m), each state mixture component being a probability distribution function approximated by a weighted sum of a number of predetermined generic probability distribution components (x), the approximation including the step of determining a weighting parameter ($w_{jmx}$) for each generic probability distribution component (x) for each state mixture component (m), the method of determining the output state (j) likelihoods comprising the steps of:
1) generating a correspondence probability signal representing a correspondence probability ($P^r_x$), wherein the correspondence probability ($P^r_x$) is the probability provided by each respective generic probability distribution component (x) based on the input speech vector ($o_r$);
2) generating a threshold signal, representing a threshold value $T_{mix}$;
3) selecting a number of output states (Nj);
4) determining, for each state mixture component (m) of each selected output state (j), whether a weighted probability ($g_{jmr}$) given by the scalar product of the weighting parameters ($w_{jmx}$) and the respective correspondence probabilities ($P^r_x$), exceeds the threshold value $T_{mix}$; and,
5) generating a set of output signals representing state likelihoods ($b_j$) for each selected output state (j) by evaluating the likelihoods of the state mixture components (m) of the respective selected output state (j) which have a weighted probability ($g_{jmr}$) exceeding the threshold $T_{mix}$.

According to a second aspect of the invention, there is provided a method of processing speech, the method comprising:

receiving the speech and determining therefrom an input speech vector ($o_r$) representing a sample of the speech to be processed; and, determining the likelihoods of a number of possible output states (j) corresponding to the input speech vector ($o_r$), wherein each output state (j) is represented by a number of state mixture components (m), each state mixture component being a probability distribution function approximated by a weighted sum of a number of predetermined generic probability distribution components (x), the approximation including the step of determining a weighting parameter ($w_{jmx}$) for each generic probability distribution component (x) for each state mixture component (m), the method of determining the output state (j) likelihoods involving determining whether a weighted probability ($g_{jmr}$) exceeds a threshold value $T_{mix}$ by determining whether a scalar product of the form:

$$S = \sum_{i=1}^{K} A_i \times B_i$$

exceeds the threshold T, where K is a predetermined integer, the determination comprising the steps of:
1) receiving a signal representing the value $A_i$, where $A_i$ represents one of the weighting parameters ($w_{jmx}$);

2) receiving a signal representing the value $B_i$, where $B_i$ represents the correspondence probability ($p'_x$) generated from the respective generic probability distribution component (x);

3) generating first, second and third signals representing the values $log(A_i)$, $log(B_i)$ and $log(T)$, respectively, 4) comparing the first, second and third signals and generating an output signal indicating that S>T if:

$log(A_i) > P \times log(T)$ AND $log(B_i) > Q \times log(T)$ where: $0 < P <= 1$ and $0 < Q <= 1$ 5) if no output signal has been generated, repeat steps 1 to 4 for subsequent values of i.

According to a third aspect of the invention, there is provided a method of processing speech, the method comprising:

receiving the speech and determining therefrom an input speech vector ($o_r$) representing a sample of the speech to be processed; and, determining the likelihoods of a number of possible output states (j) corresponding to the input speech vector ($o_r$), wherein each output state (j) is represented by a number of state mixture components (m), each state mixture component being a probability distribution function approximated by a weighted sum of a number of predetermined generic probability distribution components (x), the approximation including the step of determining a weighting parameter ($w_{jmx}$) for each generic component (x) for each state mixture component (m), wherein the method of determining the output state (j) likelihoods comprises determining a classification ($C_{jx}$) of each of the possible output states (j) for each generic component (x), the classification representing the likelihood ($L_{xm}$) of each output state (j) representing the input speech vector ($o_r$), the method of determining the classification comprising the steps of:

1) generating at least one threshold signal representing at least one threshold value $T_{good}$;

2) selecting one of the predetermined generic components (x);

3) selecting one of the number of output states (j);

4) generating a likelihood signal representing the likelihood ($L_{xm}$) of the output state (j) being the output state representing the input speech vector ($o_r$) assuming that the selected generic probability distribution component (x) provides the highest unweighted probability for the input speech vector ($o_r$) of any of the generic probability distribution components;

5) comparing the threshold signal to the likelihood signal;

6) generating and storing a first or second classification signal representing the respective classification ($C_{jx}$) of the output state (j) in accordance with the result of the comparison of the threshold signal with the likelihood signal; and, 7) repeating steps 2 to 6 for all generic components (x) and all possible output states (j).

The present invention processes speech by generating a speech vector representing a sample of the speech to be processed, and then determining which of a number of possible output states most closely represents the speech vector. The grammar and dictionary together specify the possible sequences of states. The likelihood of the input speech matching different state sequences together with the known probability of different word sequences can be combined to find the word sequence which best matches the input speech.

The comparison of the speech vector with each of the possible output states is a computationally expensive task. In the invention, the cost of the calculation can be reduced by simplifying the calculation required for each of the possible output states.

Accordingly, the invention uses a broad state classification which can be determined using a predetermined look up table. This indicates the approximate likelihood of each output state depending on which of the generic probability distribution components provides the highest unweighted probability for the input speech vector.

This classification can then be used to control the accuracy with which a state is evaluated. Thus, for example, when the state is very unlikely a simple approximation, such as the use of a constant value, is acceptable. If the state is somewhat unlikely more accuracy is required and just one of the many mixture components comprising the state probability distribution can be evaluated and used to approximate the actual state likelihood. Finally, evaluation of the more likely states uses a simplified (but approximate) mechanism for determining which of the state's many mixture components need to be evaluated to maintain the accuracy of the final state likelihood value.

The invention also uses a small number of generic distributions together with state mixture component specific weights to approximate the actual state distribution. Using this technique the approximation for each state mixture component is evaluated by comparing the scalar product of the state mixture component specific weights with the unweighted likelihood provided by each of the generic probability distribution functions with a fixed threshold. This procedure is repeated for each component of each state being considered and only for those mixture components for which the product exceeds the threshold does the accurate likelihood need to be calculated.

The invention also allows fast determination of whether a scalar product exceeds a threshold. By using single bit approximations many terms in the scalar product can be combined into a single computer word and evaluated in one operation.

Whilst all the aspects of the present invention may be employed separately, it is also possible to use any combination of the aspects in order to maximise the computational efficiency of the procedure.

BRIEF DESCRIPTION OF THE DRAWINGS

An example of the present invention will now be described with reference to the accompanying drawings, in which.

DETAILED DESCRIPTION OF ILLUSTRATIVE EMBODIMENTS

Figure 1:
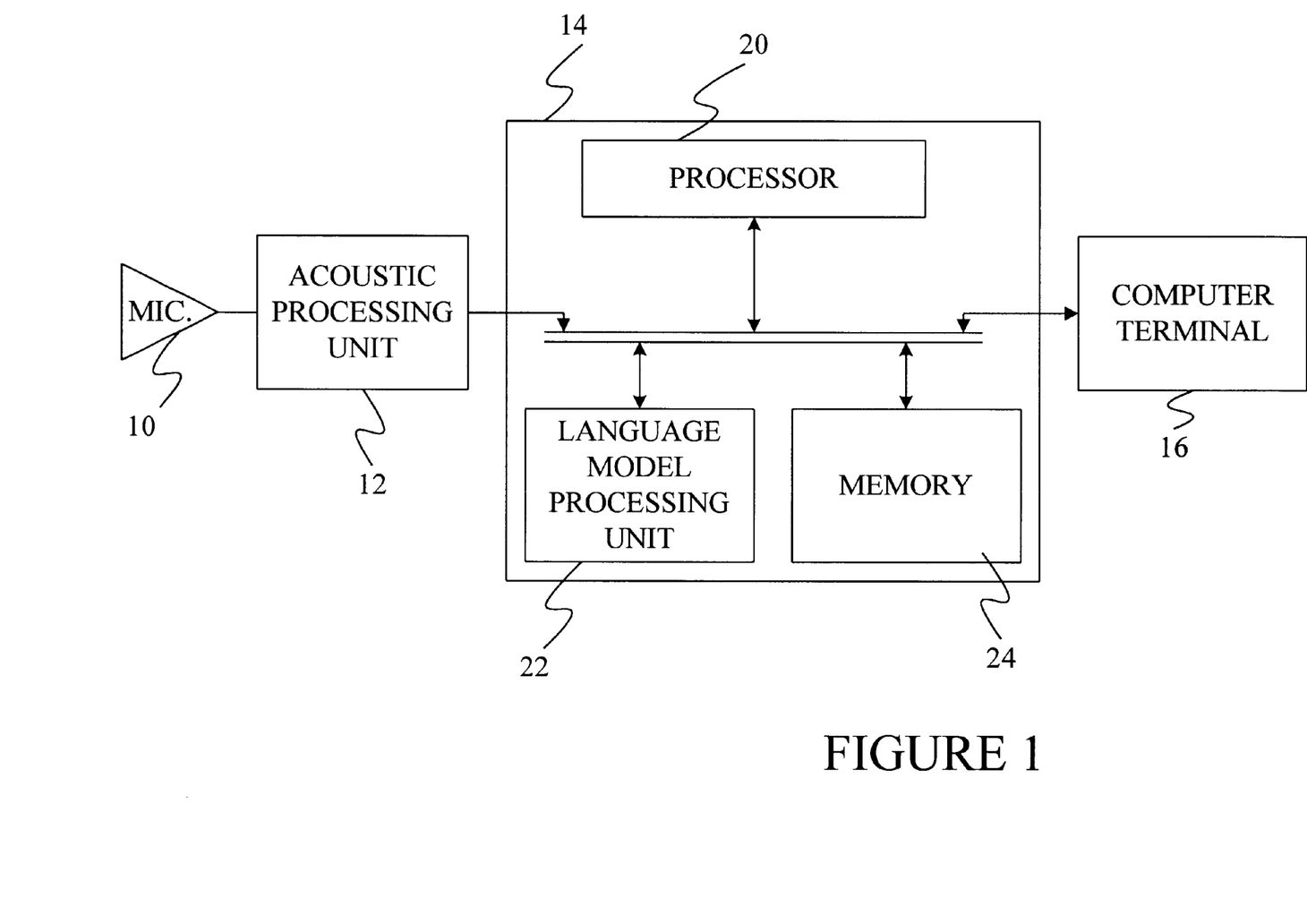
FIG. 1 shows a schematic representation of a system utilising apparatus according to the present invention; and, FIG. 2 shows a representation of a comparison of a single term of a scalar product with a threshold.

The system shown in FIG. 1 comprises a microphone 10 which is coupled to a decoder 14, via an acoustic processing unit 12. The decoder 14, which operates to decode input speech received via the processing unit 12, is connected a computer terminal 16 which is able to display the decoded speech or use the speech as input commands allowing the computer operation to be controlled.

In use, speech is spoken into the microphone 10 which generates an analogue signal representing the speech waveform. This analogue signal is fed to the acoustic processing unit 12 which samples the speech waveform at a rate of approximately 16 kHz, although this will depend on the specific implementation of the system.

The acoustic processing unit 12 divides the sampled speech into frames of approximately 10 ms duration, which are referred to as speech vectors ($o_r$). Each frame undergoes a Fast Fourier transform (fft) so as to generate a power spectrum, which is in turn parameterised to generate a set of Cepstral Parameters. Each set of Cepstral Parameters, which corresponds to a respective frame of speech, is transferred to the decoding unit 14.

In the present invention, the cepstral parameters used are mel-frequency cepstral coefficient parameters which are a cosine transformation of mel-frequency scaled filterbank amplitudes followed by a channel normalisation operation and appended with delta and delta-delta versions of the same parameters. However, it will be realised by a person skilled in the art that the use of the invention is not dependent upon the underlying meaning of the speech vector. Accordingly, the present invention can be applied in an unchanged format to alternative speech vector representations.

The decoding unit 14 comprises a processor 20, a language model processing unit 22 and a memory 24. These components are connected via a bus 26 which is also coupled to the acoustic processing unit 12 and the computer terminal 16.

In use, the set of Cepstral parameters for a given speech vector ($o_r$) are transferred to the processor 20. The processor 20 compares the speech vector ($o_r$) defined by the set of Cepstral parameters to a number of possible output states (j), details of which are stored in the memory 24. By determining which output state (j) most closely matches the input speech vector ($o_r$), the processor 20 effectively decodes the input speech by combining state likelihoods to generate an indication of the most likely word sequence which is transferred to the computer terminal 16, via the bus 26.

Each output state (j), to which the processor 20 compares the speech vector ($o_r$), is represented by a mixture of a number of probability density functions known as state mixture components (m). In typical systems, there can be many thousands of output states (j), with each output state having any number of different state mixture components associated therewith. In the present example, there are 2200 output states (j), each having 10 mixture components (m).

Each mixture component's probability distribution function is approximated by a weighted sum of a number of shared generic probability distribution functions (x). In the preferred embodiment of the invention, both the shared generic and the state mixture component probability distribution functions used are Gaussians, although Laplacian or other distributions could also be used.

The weighted sum is defined by respective weighting parameters ($w_{jmx}$) which are associated with each generic probability distribution component (x) for each state (j) for each mixture component (m). The parameters of the generic probability distribution components (x) and the weighting parameters ($w_{jmx}$) are stored in the memory 24.

Initially, the weighting parameters ($w_{jmx}$) are determined in one of two ways. Either, the weights of the state mixture components (m) are determined from training data and the respective weighting parameters ($w_{jmx}$) calculated accordingly. Or, the weighting parameters ($w_{jmx}$) may be determined directly from normal model set parameters.

In order for efficient recognition to be achieved, the pre-computation of certain data is required prior to operation. Much of this pre-computation is already performed in known systems and alternative methods for the computations will be known to a person skilled in the art.

Firstly, the example system requires the set of generic probability distribution functions (generic components), which are used to approximate the various state mixture components (m), to be calculated. For most practical systems, there will be in the region of 50 to 200 predefined generic components (x) and these are stored in the memory 24.

Secondly, a set of state classification tables is also required providing, in this example, a classification ($C_{jx}$) of "poor", "okay", or "good" for each output state (j), along with a set of best state mixture component tables, which identify the most dominant state mixture component ($B_{jx}$) (i.e. the state mixture component (m) that contributes most to the overall output state likelihood) for respective output states (j). These tables are indexed and stored in the memory 24.

Finally, as mentioned above the weighting parameters ($w_{jmx}$) for each generic component (x) for each state mixture component (m) or the single bit approximation to them explained later are also stored in the memory 24.

Each of the above sets of data are determined, in this example, as follows.

The generic distributions are found by performing a standard K-means clustering of the continuous density HMM system state mixture component mean vectors and computing a global variance for the input speech vectors. This is a well known technique.

Each state classification table is generated, for a respective output state (j) by considering if a selected generic component (x) were the "most likely" generic component (i.e. the generic component that provide the highest unweighted probability for the input speech vector), what would be the probability or likelihood of the respective output state (j) being the output state that most closely represents the input speech vector ($o_r$).

This calculation is repeated for each generic component (x) of each state mixture component (m) of the respective output state (j). Accordingly, each state classification table provides an indication of the likelihood of the respective output state (j) being the actual output state, for any "most likely" generic component (x).

The likelihoods themselves are expressed in terms of the classifications ($C_{jx}$) mentioned above, namely "good", "okay" and "poor". This division is achieved by setting two threshold levels $T_{good}$ and $T_{okay}$. If the likelihood of the possible output state (j) being the actual output state is above the threshold $T_{good}$, the output state (j) is given a classification Cj="good". If the likelihood is below the threshold $T_{okay}$ the output state has a classification Cj="poor". Otherwise the classification is Cj "okay".

The formulae employed for this determination are as follows:

$$L^1_{xjm} = -0.5 \left[ gC_m + \sum_{k=1}^{K} \frac{(\mu_{xk} - \mu_{jmk})^2}{\sigma^2_{jmk}} \right] \qquad (5)$$

$$C_{jx} = \begin{cases} \text{GOOD,} & \text{when MAX}[L^1_{xjm}] > T_{good} \\ \text{OKAY,} & \text{when } T_{good} > \underset{m}{\text{MAX}}[L^1_{xjm}] > T_{okay} \\ \text{POOR,} & \text{otherwise,} \end{cases} \quad (6)$$

Each best state mixture component table is generated, for a respective output state (j) by considering if a selected generic component (x) were the "most likely" generic component (i.e. the generic component that provides the highest unweighted probability for the input speech vector), which state mixture component (m) would be the dominant state mixture component ($B_{jx}$) within the respective output state (j). This is determined using the formulae:

$$L^2_{xjm} = -0.5 \left[ gC_m + \sum_{K=1}^{K} \frac{(\mu_{xk} - \mu_{jmk})^2 + \sigma^2_{xk}}{\sigma^2_{jmk}} \right] \quad (7)$$

$$B_{jx} = \underset{m}{\text{ARGMAX}}[L^2_{xjm}] \quad (8)$$

Again this is repeated for all generic components (x) such that each table shows the best state mixture component of the respective output state (j) for each generic component (x).

It should be noted that in this example, the matrix used to compute $L^2_{XM}$ is deliberately weighted towards the case that the possible output state (j) is relatively unlikely, since choosing the best component correctly is most important in the case in which the probability of only one state mixture component (m) is evaluated.

The weighting parameters ($w_{jmx}$) for each generic component (x) of each state mixture component (m) are determined by approximating the probability distribution of the state mixture component (m) with a weighted sum of the generic components (x). The weighting parameters ($w_{jmx}$) are then stored in the memory 24 along with the generic components (x). This is provided by the formulae:

$$L^3_{xjm} = -0.5 \left[ \frac{gC_{jm} + gC_x}{2} + \sum_{k=1}^{K} \frac{(\mu_{xk} - \mu_{jmk})^2 + \sigma^2_{xk}}{\sqrt{\sigma^2_{jmk}\sigma^2_{xk}}} \right] \quad (9)$$

$$S_{jm} = \sum_{x \in G} L^3_{xjm} \quad (10)$$

$$w_{xjm} = \begin{cases} L^3_{xjm}/S_{jm}, & \text{when } L^3_{xjm}/S_{jm} > T_{weight} \\ 0.00, & \text{otherwise} \end{cases} \quad (11)$$

It should also be noted that the generic weights could be determined in other ways, such as the use of a conventional Baum-Welch re-estimation, or computed from the continuous distribution. Employment of the above formulae has, however, the benefit of allowing rapid re-calculation of the generic weights if the HMM parameters are adapted during recognition.

Once the above values are determined, for each input speech vector (i.e. frame), the processor 20 computes the required state likelihoods as follows.

Firstly, the likelihood of each generic component (x) corresponding to the input speech vector ($o_r$) is calculated. This is done by comparing the set of Cepstral parameters of the input speech vector with the each generic component (x) and then performing the following calculation. In addition to this, the processor determines the total sum of all the likelihoods (which is needed for normalisation purposes), and the index of the most likely generic component $I_r$ using:

$$\forall x \in G \quad (12)$$

$$L^r_x = N(o_r; \mu_x \Sigma_x)$$

$$S^r = \sum_{x \in G} [L^r_x] \quad (13)$$

$$I_r = \underset{x \in G}{\text{ARGMAX}}[L^r_x] \quad (14)$$

where G is the set of all possible generic probability distribution components and $$N(o; \mu_x, \Sigma_x) = \frac{1}{\sqrt{(2\pi)^K |\Sigma_x|}} e^{-\frac{1}{2}(o-\mu_x)'\Sigma_x^{-1}(o-\mu_x)} \quad (1)$$

Once these have been calculated, preferably using the fast algorithm outlined below, the relative likelihoods (probabilities) ($P^r_x$) of each of the generic components (x) being the actual speech vector ($o_r$) are computed, using:

$$\forall x \in G \quad (15)$$

$$P^r_x = \begin{cases} L^r_x/S^r, & \text{when } L^r_x/S^r > T_{like} \\ 0.0, & \text{otherwise} \end{cases}$$

When the relative likelihood (probability) is small, it is assumed to be zero. The remaining non-zero probabilities ($P^r_x$) are used in the fast tied-mixture likelihood computations described below.

The index of the most likely generic component $I_r$ for the respective speech vector ($o_r$) is subsequently used to index the state classification and best state mixture component tables described above.

Thus for the given input speech vector ($o_r$), the state classification table can be used to obtain the likelihood classification ($C^r_{jx}$) of any possible output state (j) being the output state which represents the input speech vector ($o_r$) given the most likely generic component $I_R$. Similarly the best generic component table indicates the most dominant state mixture component ($B^r_{jx}$) which contributes most to the overall likelihood each output state (j) given the "most likely" generic component $I_R$.

For each output state (j) for which the output likelihood is needed, lookup of the output state's classification ($C^r_{jx}$) from the classification lookup table, and most dominant state mixture component ($B^r_{jx}$) from best state mixture component table is performed on the basis of the index of the best generic component $I_r$ for the current frame, with:

$$C^r_j = C_{jI_r} \quad (16)$$

$$B^r_j = B_{jI_r} \quad (17)$$

If the state is classified as "poor" a simple approximation is used to represent the probability $b^r_j$ of this possible output state (j) being the actual output state, which in the simplest case is just a constant.

$$b^r_j = \text{constant} \quad (18)$$

When the state is classified as "okay", the likelihood is calculated based on the likelihood of a single state mixture component (m) of the state. By selecting the most dominant state mixture component (m) this ensures this simplified likelihood is a reasonably accurate approximation of the actual state likelihood.

$$b'_j = N(o_r; \mu_{jB'_s}, \Sigma_{jB'_s}) \tag{19}$$

It is also possible at this time to reclassify the output state (j) on the basis of this single state mixture component (m). In this case if the likelihood of the best state mixture component (m) is such that the output state likelihood is above a threshold value $T_{upgrade}$, then the state can be upgraded to "good".

In order to minimise the computation required, when the output state (j) is classified as (or upgraded to) "good" the generic tied-mixture system is used to find an approximate state mixture component likelihood ($g_{jmr}$) for each state mixture component (m). When this approximate likelihood ($g_{jmr}$) is below a threshold $T_{mix}$, the accurate evaluation of the mixture is skipped, as will be explained below:

$$b'_j = \sum_{m=1}^{M_s} \begin{cases} c_{jm} N(o_r; \mu_{jm}, \Sigma_{jm}), & \text{iff } g_{jmr} > T_{mix} \\ 0.0, & \text{otherwise} \end{cases} \tag{20}$$

$$g_{jmr} = \sum_{x \in G} w_{xjm} P^r_x \tag{21}$$

where: $T_{mix}$ is a threshold which is stored in memory 24 and $C_{jm}$ is a weighting value for mixture m as applied to state j. Once the overall probability ($b'_j$) of each output state having a "good" classification has been calculated, the likelihoods are combined with language model probabilities transferred from the language model processing unit 22. The combined likelihoods are then used together with the constraints on state sequences specified by the dictionary and grammar, to determine the most probable word sequence. An indication of this is then transferred to the computer terminal 16.

A method of evaluating tied-mixture likelihood tests according to the present invention will now be described. The evaluation of the overall probability ($b'_j$) for each possible output state, as described above, is achieved by summing the weighted probabilities of the various state mixture components (m) for each respective output state (j). This in turn requires the calculation of the weighted sum of the generic components (x) used to approximate each respective state mixture to component (m). This would normally require a computationally expensive scalar product of the form shown below, to be evaluated.

$$S = \sum_{i=1}^{K} A_i \times B_i$$

where, in the present invention:
Ai=generic component probability P$^r$x
B$_i$=weighting parameter W$_{xjm}$ However, it has been realised that the actual value of the product is not needed only an indication of whether the scalar product (S) exceeds the threshold value $T_{mix}$. Accordingly, the present invention reduces the amount of computation required reducing the computation to a small number of bits and making use of the processors ability to process many bits in parallel.

The first step is by carrying out the calculation in the log domain. The second is to approximate the comparison by specifying that it is true if any individual term exceeds the threshold (clearly in this case the sum does exceed the threshold although some cases in which the accurate comparison is true will be missed). Finally combining these two steps we can say that since in the log domain each product term become a sum and the comparison is true if any one of the sums exceeds the threshold.

Figure 2:
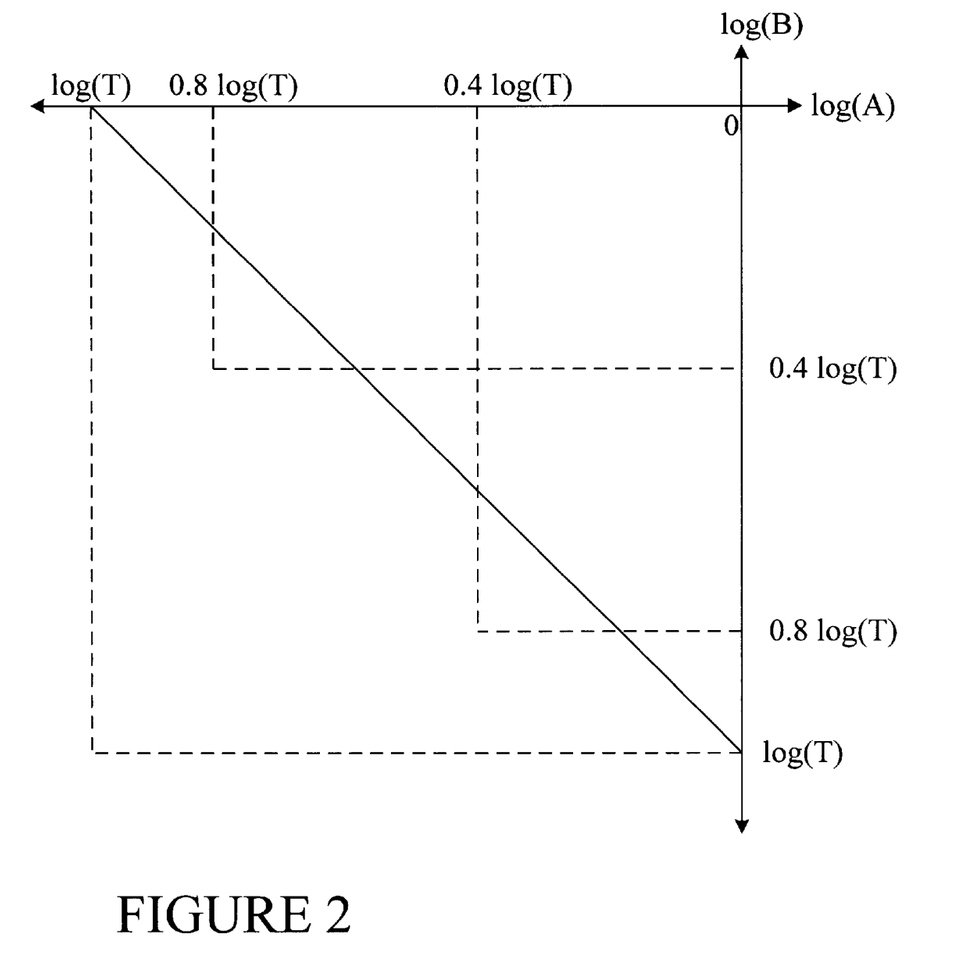

As illustrated in FIG. 2, the comparison of a sum A+B and a threshold T can be reduced to a single bit AND operation where, as in this case, A, B and T all have a negative value. For the case of a scalar product, each term in the product is represented by single bits in respective bit arrays for the respective values A$_i$ and B$_i$. If all calculations are carried out using 32 bit words by the processor 20, then this allows 32 calculations to be carried out simultaneously.

For the generic component weights, each bit of a first bit array is set equal to "1" if the respective weighting parameter Wjmx exceeds a threshold and for the generic component likelihoods each bit of a second bit array is set equal to "1" if the respective probability Prx exceeds a threshold.

For example, referring to FIG. 2, using a 1 bit approximation, the bit of each respective generic component (x) of the weighted sum defining the state mixture component (m) is set based on:

$$M^r_x = \begin{cases} 1, & \text{when } P^r_x > T_{like} \\ 0, & \text{otherwise} \end{cases} \tag{22}$$

A similar procedure is used to set the bit of the corresponding respective weighting parameters $W_{jmx}$. Accordingly, the first and second bit arrays are then combined using a logical AND operation such that the bits of the weighting parameters and respective generic components are logically ANDed. If the resultant bit has a value "1", the term A$_i$+B$_i$ exceeds the threshold T.

Overall, this means that separate terms of the scalar product can be assigned to separate bits in the bit arrays. Consequently the bit arrays can be ANDed and if any of the bits of the resultant bit array have the value "1", then the scalar product S will exceed the threshold.

Obviously, every component evaluated by the exact method is included by the 1 bit mask approximation, however, some components that would be excluded by exact evaluation are also included in the 1 bit approximation. However, as also shown in FIG. 2, more accuracy can be achieved if 2 bits are used rather than 1.

In this case, two bits of each bit array are defined for each term of the weighted sum which defines the respective state mixture component (m). For the generic component array, the first bit is set equal to "1" if:

$$M^{ir}_x = \begin{cases} 1, & \text{when } P^r_x > 0.4^* T_{like} \\ 0, & \text{otherwise} \end{cases} \tag{23}$$

and the second bit is set equal to "1" if:

$$M^{nr}_x = \begin{cases} 1, & \text{when } P^r_x > 0.8^* T_{like} \\ 0, & \text{otherwise} \end{cases} \tag{23}$$

Similar criteria are used to define the corresponding bits of the weighting parameter bit array. The bit arrays are combined using a logical AND combination to form a third bit array. This time the threshold is exceeded by the term if either the first or second bit of the third bit array equals "1". Obviously, in practice, the remaining 30 bits of each array will also be defined, with each pairs of bit corresponding to a respective term in the scalar product.

This 2 bit mask provides a better fit approximation than the 1 bit mask but could exclude components that would be included by accurate evaluation. It will therefore be realised that any number of bits could be used to represent each term in the scalar product. However, although the accuracy increases as the number of bits used per term increases, so does the amount of computation required. It is therefore necessary to strike a balance between accuracy and efficiency and in the present invention this is achieved using two bits per term.

The one bit mask approximation can be expressed in more general terms as requiring the following equation to be satisfied:

log($A_i$)>P×log(T) AND log ($B_i$)<Q×log(T)

where: 0<P<=1 and 0<Q<=1

Obviously, the smaller the values of P and Q, the fewer the number of terms that will be determined to be above the threshold, resulting in faster but possibly less accurate evaluation than if P=1 and Q=1. Accordingly, it is generally preferable that the values of P and Q are such that at least:

P+Q>=1.

For the case of the two bit approximation, this can be expressed in more general terms as requiring the following equations to be satisfied:

log($A_i$)>P×log(T) AND log ($B_i$)>Q×log(T)

OR log($A_i$)>Q×log(T) AND log ($B_i$)>P×log(T)

where: 0<P<=1 and 0<Q<=1

Again it is generally preferable that P and Q are chosen such that:

P+Q>=1.

It will be realised that similar expressions can also be derived for the cases of higher number of bit approximations.

Depending on the codebook size and the computer's word size, the combined scalar product computation and threshold comparison is reduced to one or a few word sized bit-AND operations.

For the fast evaluation of individual Gaussians, when several components of a system share a variance, as is the case with all the generic components (x) the calculation of their likelihoods can be sped up by using the tied variance to pre-scale both observation or and mean of generic components (x). i.e., the computation:

$$\log(N(o; \mu, \sum)) = -\frac{1}{2}\left[gC + \sum_{k=1}^{K}(o_k - \mu_k)^2 \sigma_k^{-2}\right] \quad (24)$$

can be replaced by:

$$\log(N(o; \mu, \sum)) = -\frac{1}{2}\left[gC + \sum_{k=1}^{K}(o'_k - \mu'_k)^2\right] \quad (25)$$

where:

Thus reducing the number of floating point operations and the required memory bandwidth by a third.

It is also possible to apply partial distance elimination to reduce the computation required to find the component likelihoods. For example, by using:

∀x∈G (sorted by $L_x^{r-1}$)

$L'_x$=N'($o_r$,$G_x$,E'), (26)

E'=Max($L'_x$-$T_{like}$,E') (27)

By knowing the current best generic component, evaluation of N' can be halted when the limit is reached.

That is, when $$\log(N'(o; \mu, \sum)) = -\frac{1}{2}\left[gC + \sum_{k=1}^{K}(o'_k - \mu'_k)^2\right] \quad (28)$$

falls below (Er) evaluation is halted and the component is ignored. This improves speed without affecting accuracy.

What is claimed is:

1. A method of processing speech, the method comprising:

receiving the speech and determining therefrom an input speech vector ($o_r$) representing a sample of the speech to be processed; and, determining the likelihoods of a number of possible output states (j) corresponding to the input speech vector ($o_r$), wherein each output state (j) is represented by a number of state mixture components (m), each state mixture component being a probability distribution function approximated by a weighted sum of a number of predetermined generic components (x), the approximation including the step of determining a weighting parameter ($w_{jmx}$) for each generic component (x) for each state mixture component (m), the method of determining the output state (j) likelihoods comprising the steps of:

1) generating a correspondence probability signal representing a correspondence probability ($P^r_x$), wherein the correspondence probability ($P^r_x$) is the probability of each respective generic component (x) corresponding to the input speech vector ($o_r$);

2) generating a threshold signal, representing a threshold value $T_{mix}$;

3) selecting a number of output states (Nj);

4) determining, for each state mixture component (m) of each selected output state (j), whether a weighted probability ($g_{jmr}$) given by the scalar product of the weighting parameters ($w_{jmx}$) and the respective correspondence probabilities ($P^r_x$), exceeds the threshold value $T_{mix}$; and, 5) generating a set of output signals representing state likelihoods ($b_j$) for each selected output state (j) by evaluating the likelihoods of all the state mixture components (m) of the respective selected output state (j) which have a weighted probability ($g_{jmr}$) exceeding the threshold $T_{mix}$.

2. A method according to claim 1, wherein the method of evaluating the likelihood of a number of possible output states (Nj) involves selecting the output states (j) for which an approximate likelihood ($L_{jx}$) of the respective output state (j) being the output state representing the input speech vector ($o_r$) exceeds a predetermined threshold value $T_{good}$.

3. A method according to claim 2, wherein the method of evaluating the likelihood of a number of possible output states (Nj) further comprises determining a classification ($C_{jx}$) of each of the possible output states (j) for each generic component (x), the classification representing the likelihood ($L_{xm}$) of each output state (j) representing the input speech vector ($o_r$), the method of determining the classification comprising identifying a generic component (x) that provides a highest unweighted probability for input speech vector ($o_r$) and using the identified generic component (x) and the output state (j) to retrieve a stored classification, the stored classification formed through steps of:

1) generating at least one threshold signal representing at least one threshold value $T_{good}$;
2) selecting one of the predetermined generic components (x);
3) selecting one of the number of output states (j);
4) generating a likelihood signal representing the likelihood ($L_{xm}$) of the output state (j) being the output state representing an input speech vector assuming that the selected generic component (x) provides a highest unweighted probability for an input speech vector;
5) comparing the threshold signal to the likelihood signal;
6) generating and storing a first or second classification signal representing the respective classification ($C_{jx}$) of the output state (j) in accordance with the result of the comparison of the threshold signal with the likelihood signal; and,
7) repeating steps 2 to 6 for all generic components (x) and all possible output states (j).

4. A method according to claim 3, wherein the method of storing classifications ($C_{jx}$) further comprises generating a second threshold signal representing a second threshold value Tokay, wherein the step of comparing the threshold signal to the likelihood signal comprises comparing the likelihood signal to the first and second threshold signals, and wherein the step of generating a classification signal comprises generating and storing a first, second or third classification signal representing one of respective first, second or third classifications ($C_{jx}$) of the respective output state (j) in accordance with the result of the comparison of the first and second threshold signals with the likelihood signal.

5. A method according to claim 4, wherein the output state likelihood ($b_j$) of all output states (j) having the third classification ($C_{jx}$) is set to be constant.

6. A method according to claim 4 or 5, wherein the method further comprises determining a best state mixture component ($B_{jx}$) for each possible generic component (x) of each possible output state (j), the best state mixture component ($B_{jx}$) representing the state mixture component (m) that contributes most to the overall likelihood ($b_j$) of the respective output state (j).

7. A method according to claim 6, wherein if an output state (j) has the second classification ($C_{jx}$), the method further comprises:
evaluating the state mixture component likelihood for the best state mixture component ($B_{jx}$), for the respective output state;
comparing the likelihood to a threshold value $T_{upgrade}$; and,
re-classifying the output state (j) as having a first classification ($C_{jx}$) if the value of the likelihood is greater than that of threshold value $T_{upgrade}$.

8. A method according to claim 1, wherein the method of determining whether the weighted probability ($g_{jmr}$) exceeds the threshold value $T_{mix}$ comprises determining whether a scalar product of the form:

$$S = \sum_{i=1}^{K} A_i \times B_i$$

exceeds the threshold T, where K is a predetermined integer, the determination comprising the steps of:
1) receiving a signal representing the value $A_i$, where $A_i$ represents one of the weighting parameters ($w_{jmx}$);
2) receiving a signal representing the value $B_i$, where $B_i$ represents the correspondence probability ($P^r_x$) of the respective generic component (x);
3) generating first, second and third signals representing the values $\log(A_i)$, $\log(B_i)$ and $\log(T)$, respectively,
4) comparing the first, second and third signals and generating an output signal indicating that S>T if:

$\log(A_i)>P\times\log(T)$ AND $\log(B_i)>Q\times\log(T)$ where: $0<P<=1$ and $0<Q<=1$
5) if no output signal has been generated, repeat steps 1 to 4 for subsequent values of i.

9. A method according to claim 8, wherein step 4) comprises the sub-steps of:
1) Defining a first bit array and a second bit array;
2) Setting each ith bit in the first bit array equal to "1" for a number of values of i, if:

$\log(A_i)>P\times\log(T)$;

3) Setting each ith bit in the second bit array equal to "1" for the number of values of i, if:

$\log(B_i)>Q\times\log(T)$;

4) Combining the first and second bit arrays using a logical AND combination to generate a third binary array and generating an output signal if any of the respective ith bits of the third binary array contains the value "1".

10. A method according to claim 8, wherein step 4) further comprises comparing the first, second and third signals and generating an output signal indicating that S>T if:

$\log(A_i)>Q\times\log(T)$ AND $\log(B_i)>P\times\log(T)$ where: $0<P<=1$ and $0<Q<=1$.

11. A method according of claim 8, wherein:

$P+Q>=1$.

12. A method according to claim 1, wherein if the correspondence probability ($P^r_x$) is below a predetermined threshold $T_{like}$, the correspondence probability ($P^r_x$) is set equal to 0.

13. A method of processing speech, the method comprising:
receiving the speech and determining therefrom an input speech vector ($o_r$) representing a sample of the speech to be processed; and,
determining the likelihoods of a number of possible output states (j) corresponding to the input speech vector ($o_r$), wherein each output state (j) is represented by a number of state mixture components (m), each state mixture component being a probability distribution function approximated by a weighted sum of a number of predetermined generic components (x), the approximation including the step of determining a weighting parameter ($w_{jmx}$) for each generic component (x) for each state mixture component (m), the method of determining the output state (j) likelihoods involving determining whether a weighted probability ($g_{jmr}$) exceeds a threshold value $T_{mix}$ by determining whether a scalar product of the form:

$$S = \sum_{i=1}^{K} A_i \times B_i$$

exceeds the threshold T, where K is a predetermined integer, the determination comprising the steps of:
1) receiving a signal representing the value $A_i$, where $A_i$ represents one of the weighting parameters ($w_{jmx}$);
2) receiving a signal representing the value $B_i$, where $B_i$ represents the correspondence probability ($P^r_x$) of the respective generic component (x);
3) generating first, second and third signals representing the values $\log(A_i)$, $\log(B_i)$ and $\log(T)$, respectively,
4) comparing the first, second and third signals and generating an output signal indicating that S>T if:

$\log(A_i)>P\times\log(T)$ AND $\log(B_i)>Q\times\log(T)$ where: $0<P<=1$ and $0<Q<=1$
5) if no output signal has been generated, repeat steps 1 to 4 for subsequent values of i.

14. A method according to claim 13, wherein step 4) comprises the sub-steps of:
1) Defining a first bit array and a second bit array;
2) Setting each ith bit in the first bit array equal to "1" for a number of values of i, if:

$\log(A_i)>P\times\log(T)$;

3) Setting each ith bit in the second bit array equal to "1" for the number of values of i, if:

$\log(B_i)>Q\times\log(T)$;

4) Combining the first and second bit arrays using a logical AND combination to generate a third binary array and generating an output signal if any of the respective ith bits of the third binary array contains the value "1".

15. A method according to claim 13, wherein step 4) further comprises comparing the first, second and third signals and generating an output signal indicating that S>T if:

$\log(A_i)>Q\times\log(T)$ AND $\log(B_i)>P\times\log(T)$ where: $0<P<=1$ and $0<Q<=1$.

16. A method according claim 13, wherein: $P+Q>=1$.

17. A method according to claim 13, wherein the method of evaluating the likelihood of a number of possible output states (Nj) involves selecting the output states (j) for which an approximate likelihood ($L_{jx}$) of the respective output state (j) being the output state representing the input speech vector ($o_r$) exceeds a predetermined threshold value $T_{good}$.

18. A method according to claim 17, wherein the method of evaluating the likelihood of a number of possible output states (Nj) further comprises determining a classification ($C_{jx}$) of each of the possible output states (j) for each generic component (x), the classification representing the likelihood ($L_{xm}$) of each output state (j) representing the input speech vector ($o_r$), the method of determining the classification comprising identifying a generic component (x) that provides a highest unweighted probability for input speech vector ($o_r$) and using the identified generic component (x) and the output state (j) to retrieve a stored classification, the stored classification formed through steps of:

1) generating at least one threshold signal representing at least one threshold value $T_{good}$;
2) selecting one of the predetermined generic components (x);
3) selecting one of the number of output states (j);
4) generating a likelihood signal representing the likelihood ($L_{xm}$) of the output state (j) being the output state representing an input speech vector assuming that the selected generic component (x) provides the highest unweighted probability for an input speech vector;
5) comparing the threshold signal to the likelihood signal;
6) generating and storing a first or second classification signal representing the respective classification ($C_{jx}$) of the output state (j) in accordance with the result of the comparison of the threshold signal with the likelihood signal; and,
7) repeating steps 2 to 6 for all generic components (x) and all possible output states (j).

19. A method of processing speech, the method comprising:
receiving the speech and determining therefrom an input speech vector ($o_r$) representing a sample of the speech to be processed; and,
determining the likelihoods of a number of possible output states (j) corresponding to the input speech vector ($o_r$), wherein each output state (j) is represented by a number of state mixture components (m), each state mixture component being a probability distribution function approximated by a weighted sum of a number of predetermined generic components (x), the approximation including the step of determining a weighting parameter ($w_{jmx}$) for each generic component (x) for each state mixture component (m),
wherein the method of determining the output state (j) likelihoods comprises determining a classification ($C_{jx}$) of each of the possible output states (j) for each generic component (x), the classification representing the likelihood ($L_{xm}$) of each output state (j) representing the input speech vector ($o_r$), the method of determining the classification comprising identifying a generic component (x) that provides a highest unweighted probability for input speech vector ($o_r$) and using the identified generic component (x) and the output state (j) to retrieve a stored classification, the stored classification formed through steps of:

1) generating at least one threshold signal representing at least one threshold value $T_{good}$;
2) selecting one of the predetermined generic components (x);
3) selecting one of the number of output states (j);
4) generating a likelihood signal representing the likelihood ($L_{xm}$) of the output state (j) being the output state representing an input speech vector assuming that the selected generic component (x) provides the highest probability of all of the generic components (x) for an input speech vector;
5) comparing the threshold signal to the likelihood signal;
6) generating and storing a first or second classification signal representing the respective classification ($C_{jx}$) of the output state (j) for generic component (x) in accordance with the result of the comparison of the threshold signal with the likelihood signal; and,
7) repeating steps 2 to 6 for all generic components (x) and all possible output states (j).

* * * * *

UNITED STATES PATENT AND TRADEMARK OFFICE
CERTIFICATE OF CORRECTION

PATENT NO. : 6,370,505 B1
DATED : April 9, 2002
INVENTOR(S) : Odell

It is certified that error appears in the above-identified patent and that said Letters Patent is hereby corrected as shown below:

Column 3,
Line 2, replace "$p_x^r$" with -- $P_x^r$ --.

Column 6,
Lines 54 and 58, replace "Tokay" with -- $T_{okay}$ --.

Column 8,
Lines 42 and 46, replace "$I_R$" with -- $I_r$ --.

Column 9,
Line 28, after "state j." begin new paragraph.

Line 56, replace " $P^r x$ " with -- $P_x^r$ --.

Line 63, replace "processors" with -- processor's --.

Column 10,
Line 16, replace "Wjmx" with -- $W_{jmx}$ --.

Line 18, replace "Prx" with -- $P_x^r$ --.

Line 52, replace " $M_x^{nr} = \begin{cases} 1, & \text{when } P_x^r > 0.8 * T_{like} \\ 0, & \text{otherwise} \end{cases}$ " with
-- $M_x^{nr} = \begin{cases} 1, & \text{when } P_x^r > 0.8 * T_{like} \\ 0, & \text{otherwise} \end{cases}$ --.

Column 12,
Line 18, replace "Er" with -- $E_r$ --.

UNITED STATES PATENT AND TRADEMARK OFFICE
CERTIFICATE OF CORRECTION

PATENT NO. : 6,370,505 B1
DATED : April 9, 2002
INVENTOR(S) : Odell

It is certified that error appears in the above-identified patent and that said Letters Patent is hereby corrected as shown below:

Column 13,
Line 49, after "4" delete "or 5".

Signed and Sealed this

Twenty-second Day of October, 2002

Attest:

Attesting Officer

JAMES E. ROGAN
Director of the United States Patent and Trademark Office